3,838,196
METHOD OF TREATING ARTERIOSCLEROSIS

James B. Mercer, Lenexa, Kans., assignor to James B. Mercer, Lenexa, Kans., and Neil B. Purdy, Wauconda, Ill.
No Drawing. Filed Sept. 25, 1972, Ser. No. 291,563
Int. Cl. A61k 27/00
U.S. Cl. 424—319                   1 Claim

ABSTRACT OF THE DISCLOSURE

A treatment for aberrant calcium related deposits in animal tissues, including arteriosclerosis, comprises the oral administration of EDTA concurrently with monitoring for depletion of metabolic trace metals, and replacement of the trace metals as indicated.

---

Over approximately the past three decades, several chelating agents have been investigated for therapeutic and physiological effects in animals. These electron-donating compounds are often able to displace and firmly bind metallic cations, generally having valences of two or more, producing a chelate formation having substantially different properties than that possessed by the metal or the chelating agent taken by themselves. The most notable property changes involve solubility, chemical reactivity and stability, and common metals subject to chelation include beryllium, cadmium, calcium, chromium, cobalt, copper, iron, lead, magnesium, manganese, mercury, nickel, strontium and zinc.

Although many metabolic processes and known pharmaceuticals probably involve chelation, the earliest intended therapeutic use of chelates probably was for the removal of arsenic in treating cases of poisoning. Subsequently, effectiveness has been shown for treating other types of metal poisoning including nickel, mercury, copper, zinc, cadmium, cobalt and chromium, and for some types of radioisotope contamination, including radium. Well known chelating agents of relatively low toxicity, ethylenediamine tetra-acetates (EDTA), in addition to the above noted therapeutic decontamination uses, have shown some promise as anticoagulants, for hypertension relief, combating digitalis toxicity, lowering of calcium serum level in hypercalcemia, treating scleroderma and in the removal of urinary lime calculi.

EDTA, especially the calcium di-sodium salt $$(Na_2[CaEDTA]),$$

further, has been investigated as a treatment for the removal of metastatic calcium deposits in various internal body tissues including the kidneys, pancreas and blood vessels, the latter for the removal of atherosclerotic plaques associated with occlusive vascula disease. Although investigations where intravenous infusions of EDTA were utilized for treating generalized arteriosclerosis indicated that an important therapeutic management tool may have been discovered, the treatment has not been well accepted, apparently because of the long-term hospitalization, or other intensive care, and injection discomfort which was believed necessary, coupled with a lack of consistently favorable results.

It has been noted that prior practitioners of EDTA therapy for the treatment of arteriosclerosis have attempted to compensate for certain deficiencies resulting from by-product sequesteration, that is, the removal of other metals in addition to calcium. Thus, the administration of vitamin B6 (pyridoxine hydrochloride) and, during pregnancies, zinc, has been suggested as a desired supplment in connection with the primary treatment. Also, it has been suggested that diabetic patients should not be given zinc insulin during the treatment. In accordance with discoveries related to this invention, however, the prior unpredictability of EDTA therapy often could be attributed to the creation of a metabolic imbalance resulting from the by-product sequestration of a number of trace metals including copper, iron, magnesium and manganese. Therefore, by monitoring the spectrum of trace metals required for body metabolism and replacement of all serious deficiencies noted, the chances of successful treatment of pathological aberrant calcium related deposits, such as in arteriosclerosis, can be substantially increased.

Further, although the oral administration of EDTA is known, it has largerly been ignored for the treatment of arteriosclerosis because it appeared to be quickly and substantially completely eliminated without passing across the gastric mucosa, thus resulting in the introduction of only a small and unpredictable amount into the blood stream. However, such previous administration of EDTA orally has often been with food, whereupon it likely sequestered metals commonly present in the food, rendering the drug substantially inactive therapeutically and lending credence to a belief of oral inactivity. Yet, it has been noted that EDTA, orally administered under proper conditions in suseceptible patients, has precipitated gall stone attacks, indicating, contrary to general belief, that the drug can pass through the gastric mucosa and into body tissues, after which it is apparently redeposited into the gastrointestinal tract at least partially through the bililary tree. In accordance with this invention, by administering the drug orally on an empty stomach, suitably adjusted for pH, for example, by mixing with an edible agent such as fruit juice, citric acid, etc., movement into the blood stream and permeation into body tissues in therapeutic quantities appears to be reasonably assured.

In the practice of this invention, the combined regimen of proper oral administration of EDTA, with monitoring and replacement of the spectrum of metabolic trace metals, where depletion is indicated, appears to provide a convenient and effective treatment for diseases created by aberrant calcium related deposits, such as arteriosclerosis.

The principal objects of this invention are: to provide a more predictable chelation treatment for diseases created by aberrant calcium related deposits such as arteriosclerosis; to provide a method of treating such diseases which produces fewer unwanted side effects; to provide such a treatment which involves substantially less pain, inconvenience and expense in administering; and to provide a system of practical, long-term therapy for such diseases.

Other objects and advantages of this invention will become apparent from the following description wherein are set forth, by way of example, certain embodiments of this invention.

A succesful treatment for diseases by aberrant calcium related deposits in tissues has comprised the administration to adults of about three grams of tetra-sodium EDTA ($Na_4EDTA$) orally in six ounces of fruit juice on an empty stomach, daily for a period of approximately six to eight weeks and then, if indicated, a reduction to a maintenance oral dose of three grams in fruit juice approximately three times weekly over an extended period. During the treatment, the patient is monitored for evidence of trace metal depletion of zinc, copper, iron, magnesium and manganese and supplied suitable supplements for compensation where depletion is shown or suspected.

Using the noted regimen substantial improvements have been noted for conditions including: loss of memory caused by arteriosclerosis involving cerebral circulation and the carotid and vertebral arteries; hypertensive cardiovascular disease with high cholesterol and chest pains representative of ischemic heart disease and general arteriosclerotic changes in the great blood vessels; partial loss of use of hands and feet and incontinence due to prior stroke and peripheral vascular disease in a diabetic; probable impairment of cerebral circulation due to obstructive carotid disease coupled with cervical arthritis; generalized arthritis; cardiac anginal episodes during effort; and impairment of upper extremity circulation apparently caused by early generalized arteriosclerotic disease involving the great vessels as well as peripheral circulation.

A specific case for illustration involved a 59 year old white male, seen for the first time in 1966, who had developed a progressive generalized arteriosclerotic process which seemed to involve his entire body, including the GI tract and cardiovascular system. In 1968 he showed marked deterioration in ability to work and think and experienced progressively more anginal pain. He was recommended for, and underwent, right coronary endarectomy and a bilateral Vineberg implanatation of the internal mammery arteries, after which he did fairly well for about one year, and then cardiac angina returned and abdominal angina and shaking began, with progressively severe headaches. The surgeons disclaimed the ability to help the patient further. Intravenous EDTA provided maintenance for about sixteen months, but little improvement.

In August, 1971 he was switched to oral administration (three grams $Na_4EDTA$ in six ounces juice daily on an empty stomach) with, for the first time, trace metal spectrum monitoring and replacement. After six weeks of therapy he showed a marked reduction in his headaches, shaking spells ceased, memory and clearness of thought improved, anginal pains largely disappeared and he has returned to a relatively normal life. Daily, rather than the usual three times weekly or every other day maintenance dosage, was found to be necessary, so far, for maintaining present improvement.

A second illustration involved a 65 year old white male first seen in December of 1971 with impaired peripheral circulation particularly evidenced by a decreased dorsalis pedis pulse with other pulsations in the lower extremities being just equal to that found bilaterally in the brachial arteries using Doppler precutaneous systolic blood pressure determination. After six months of therapy using three grams of calcium di-sodium EDTA in six ounces of fruit juice daily on an empty stomach (selected for use after it appeared that tetra-sodium EDTA was not well tolerated), together with trace metal monitoring and replacement, the patient's blood pressure relationship between the brachial arteries and the lower extremities showed a marked improvement. As indicated in the following data, the brachial artery systolic pressure fell with a rise in systolic pressure in the lower extremities.

TABLE I

|  | December 16, 1971 | April 1, 1972 | June 24, 1972 |
|---|---|---|---|
| Right brachial | 150 | 166 | 158 |
| Right posterior tibia | 150 | 192 | 184 |
| Right dorsalis pedis | 160 | 192 | 182 |
| Left brachial | 150 | 166 | 156 |
| Left posterior tibia | 155 | 190 | 184 |
| Left dorsalis pedis | 135 | 190 | 184 |

In a third illustrative case a 74 year old white male had arthritis for one and one-half years when first seen in June 1972. Pain was experienced in nearly all joints and was so severe that he had difficulty in any movement and even when lying down he developed pain in his buttocks and the back of his thighs. After taking orally three grams of $Na_4EDTA$ in juice daily on an empty stomach for two months, with trace metal monitoring and replacement, this patient showed marked improvement to the point where the only joint giving him trouble was his left wrist, which also was substantially improved. His prior difficulty in dressing and undressing himself was largely eliminated and he was able to walk about one mile daily without arthritic pain.

A fourth illustration involved a 55 year old white male whose severe chest pains lasted as long as ten minutes, three or four times daily and were ultimately diagnosed as anginal due to impaired blood circulation. This patient was unresponsive to Inderal 40 mg. and nitroglycerine. He had a blood pressure reading of $$\frac{130}{80}$$

with a pulse of 84 when he was prescribed three grams of $CaN_2EDTA$ orally in fruit juice daily, with trace metal monitoring and replenishing. Eleven days later his blood pressure had a blood pressure reading of with a pulse of 84 when he was prescribed three grams of $CaN_2EDTA$ orally in fruit juice daily, with trace metal monitoring and replenishing. Eleven days later his blood pressure was $$\frac{120}{80}$$

pulse 70, and he stated that his chest pains had decreased and he felt much better. After an additional seventeen days on this therapy, the patient's blood pressure was $$\frac{106}{70}$$

pulse 76, and chest pains had decreased to the point where the patient was considered markedly improved.

While wide variations in EDTA primary treatment dosage and maintenance dosage are sometimes indicated, in general the primary treatment is varied from about two grams to about five grams daily for from four to twelve weeks and where reduction is permitted without relapse, maintenance dosage from about two to about five grams two to four times weekly. In the alternative, maintenance dosage may be about one half of the above dosage taken each day. Some experimentation is often necessary to establish the best regimen for a particular patient. Also, di-sodium EDTA, tri-sodium EDTA, magnesium EDTA and other variations of the salt appear operable for the stated purpose and may be preferable under some circumstances than the more completely investigated tetra-sodium EDTA and calcium di-sodium EDTA.

The anti-atherogenic diet is also recommended in conjunction with the EDTA treatment for arteriosclerosis to restrict any additional loading of calcium and saturated fats. Routine management of these cases further indicates the use of multiple vitamins, including pyridoxine hydrochloride lipotropic agents in the presence of hepatic disease and a lowering of insulin intake with diabetic patients. Vasodilating drugs, where indicated, may help the absorbed EDTA reach otherwise blocked sites where the therapy is needed.

The EDTA therapy regimen above discussed has been found to produce no significant adverse changes in the urine, although a temporary increase in excreted calcium is expected along with fluxuations in serum calcium.

When depletion of trace metals is noted, common dietary supplements appear satisfactory for replacement, for example, magnesium tablets, zinc sulfate, iron tablets, etc., in indicated amounts. Particularly, zinc supplementation appears essential during pregnancy to avoid possible fetus malformation.

As this invention may be embodied in several forms without departing from the spirit or essential characteristics thereof, the present embodiments are to be considered only illustrative, and since the scope of the invention is defined by the appended claim, all changes that fall within the metes and bounds of the claim or that form their functional as well as conjointly cooperative equivalents are intended to be embraced by the claim.

What I claim and desire to secure by Letters Patent is:

1. In a method for treating an animal host having calcium related arteriosclerosis by the oral administration of EDTA, the improvement which comprises:
   (a) administering EDTA selected from the group consisting of tetra-sodium EDTA and calcium disodium EDTA in an adult dose of about two to five grams daily and suitably adjusted in pH for oral administration during periods when the stomach is substantially empty,
   (b) monitoring said host for depletion of one or more of the group of trace metals consisting of copper, iron, magnesium, manganese and zinc during the treatment, and
   (c) selectively replacing depleted members of the monitored group where indicated.

References Cited

UNITED STATES PATENTS

| | | | |
|---|---|---|---|
| 2,781,291 | 2/1957 | Rubin et al. | 424—319 |
| 3,184,381 | 5/1965 | Ashmead | 424—319 |

FOREIGN PATENTS

| | | | |
|---|---|---|---|
| 603,385 | 8/1960 | Canada | 424—319 |

ALBERT T. MEYERS, Primary Examiner

F. E. WADDELL, Assistant Examiner